United States Patent [19]

Freeman et al.

[11] Patent Number: 4,998,784
[45] Date of Patent: Mar. 12, 1991

[54] AUTOMOTIVE WINDSHIELD FOR A HEAD UP DISPLAY SYSTEM

[75] Inventors: Glenn E. Freeman, Tarentum; James L. Valimont, Cheswick, both of Pa.; James H. Dunaway, Stow, Ohio; Karen J. Korenkiewicz, Gibsonia, Pa.

[73] Assignee: PPG Industries, Inc., Pittsburgh, Pa.

[21] Appl. No.: 238,799

[22] Filed: Aug. 31, 1988

[51] Int. Cl.⁵ .............................................. G02B 5/32
[52] U.S. Cl. .................................. 350/3.7; 350/174; 350/321; 430/2
[58] Field of Search ..................... 350/3.6, 3.65, 174, 350/3.7, 321, 1.61; 430/1, 2, 13, 14, 168; 283/86, 72, 101

[56] References Cited

U.S. PATENT DOCUMENTS

| | | |
|---|---|---|
| 1,871,877 | 8/1932 | Buckman . |
| 2,264,044 | 11/1941 | Lee . |
| 2,641,159 | 6/1949 | Mihalakis . |
| 2,750,833 | 5/1952 | Gross . |
| 3,276,813 | 7/1964 | Shaw . |
| 3,281,296 | 4/1963 | Jameson . |
| 3,311,517 | 6/1963 | Keslar et al. . |
| 3,446,916 | 7/1964 | Abel et al. . |
| 3,523,847 | 8/1970 | Edwards ............................... 156/99 |
| 3,840,289 | 10/1974 | Day . |
| 3,848,974 | 11/1974 | Hosking et al. . |
| 3,885,095 | 5/1975 | Wolfson et al. . |
| 3,887,273 | 6/1975 | Griffiths . |
| 3,899,241 | 8/1975 | Malobicky, Jr. et al. . |
| 3,940,204 | 2/1976 | Withrington . |
| 4,102,722 | 7/1978 | Shoop . |
| 4,218,111 | 8/1980 | Withrington et al. . |
| 4,232,943 | 11/1980 | Rogers . |
| 4,261,635 | 4/1981 | Freeman . |
| 4,356,052 | 10/1982 | Moraw et al. . |
| 4,367,411 | 1/1983 | Graube ............................... 350/3.61 |
| 4,398,799 | 8/1983 | Swift . |
| 4,530,564 | 7/1985 | Close ................................... 350/3.69 |
| 4,582,389 | 4/1986 | Wood et al. . |
| 4,613,200 | 9/1986 | Hartman . |
| 4,669,810 | 6/1987 | Wood . |
| 4,683,371 | 7/1987 | Drexler ............................... 350/3.61 |
| 4,696,713 | 9/1987 | Okafuji et al. . |
| 4,711,544 | 12/1987 | Iino et al. . |
| 4,728,377 | 1/1988 | Gallagher ........................ 350/162.17 |
| 4,737,001 | 4/1988 | Moss ..................................... 350/3.6 |
| 4,740,780 | 4/1988 | Brown et al. . |
| 4,790,613 | 12/1988 | Moss ..................................... 350/174 |
| 4,818,045 | 4/1989 | Chang ................................... 350/174 |
| 4,826,270 | 5/1989 | Ophers et al. ........................ 350/3.7 |
| 4,842,389 | 6/1989 | Wood et al. .......................... 350/174 |
| 4,856,857 | 8/1989 | Takeuchi et al. ................... 350/3.61 |

FOREIGN PATENT DOCUMENTS

| | | |
|---|---|---|
| 216692 | 4/1987 | European Pat. Off. . |
| 61-83571 | 4/1986 | Japan .................................... 350/3.6 |
| 2006209 | 5/1979 | United Kingdom . |

OTHER PUBLICATIONS

Flight International, Jun. 24, 1989.
VW Documentation.
Aviation Week & Space Technology, Simulator Aids Aircraft Design, Brown, Feb. 7, 1972, pp. 38–41.
Aviation Week & Space Technology, Cat. 2 Jet Tests Head-Up Display, Stein, Mar. 6, 1972, pp. 53–55.
Photonics Spectra, Oct. 1987, p. 178.
Japan Autotech Report, Jul. 31, 1988, vol. 45, p. 32.
Portland Oreg. Newspaper, Company Finds New Uses for Head-Up Display, Rodewald.
Glass Magazine, Head-Up Display Windshield Developed, Aug. 1987.

Primary Examiner—Bruce Y. Arnold
Assistant Examiner—J. P. Ryan
Attorney, Agent, or Firm—Andrew C. Siminerio

[57] ABSTRACT

An automotive windshield for a head up display system is disclosed. The windshield includes a hologram embedded within the windshield assembly. In fabricating the windshield, the hologram, is deposited on a carrier substrate. The hologram is initially adhered to the windshield interlayer and the carrier substrate is removed, leaving the hologram. The windshield is then assembled and laminated.

25 Claims, 2 Drawing Sheets

AUTOMOTIVE WINDSHIELD FOR A HEAD UP DISPLAY SYSTEM

BACKGROUND OF THE INVENTION

1. Field of Invention

This invention relates to a head up display system, and in particular to an automotive windshield with the combiner for a head up display system incorporated into the automotive windshield.

2a. Technical Considerations

A head up display system is a system that displays information to a viewer while he simultaneously views the real world around and through the display. A head up display system is often incorporated into aircraft cockpits for pilots to monitor flight information, and more recently the systems have been used in land vehicles, such as cars, trucks and the like The display system is generally positioned so that the viewer does not have to glance downward towards the vehicle dashboard and away from the viewing area in front of the vehicle as is normal for vehicle operation to view the operating information.

Head up display systems generally include a display projection system, a collimator and a combiner. The projection system includes a light source that projects operating information through the collimator which generally aligns the projected light rays. The collimated light is reflected off the combiner, which is a wavelength selected element positioned in a portion of the operator field of view, such that the operating information which is reflected off the combiner may be easily viewed by the operator. Depending on how the collimator aligns the projected light rays, the reflected image may be focused anywhere from a position immediately in front of the vehicle to optical infinity.

The combiner may be any wavelength selective reflective material such as a holograph or reflective metallic film. In a holographic head up display windshield system, the combiner is a hologram which may be applied to a film carrier and positioned in the interlayer between the transparent glass plies of the windshield. It can be appreciated that a head up display system providing important vehicle information such as, for example, fuel supply and vehicle speed positioned within the motorist field of vision through the windshield will permit the motorist to safely maintain eye contact with the real world while simultaneously viewing the display information.

The interlayer material in a windshield is typically a heat sensitive material, such as polyvinylbutyral, which flows during the windshield laminating operation. When the holographic combiner is embedded within the interlayer, the combiner may distort due to the flowing characteristics of the interlayer material, adversely affecting its reflective properties and optical quality of the windshield. In addition, the combiner reduces the windshield optical quality by introducing additional materials between the windshield glass plies.

It would be advantageous to have the combiner as thin as possible and to maintain the combiner surface parallel to the major surfaces of the glass plies so as to reduce optical distortion through the windshield and maintain the reflective properties of the combiner.

PATENTS OF INTEREST

U.S. Pat. No. 1,871,877 to Buckman teaches a display system having a glass sheet mounted on the windshield or dashboard which reflects instrumentation information to the vehicle operator.

U.S. Pat. No. 2,264,044 to Lee teaches a motor vehicle speedometer wherein an illuminated speedometer display is reflected off the inboard surface of the vehicle windshield.

U.S. Pat. No. 2,641,152 to Mihalakis teaches a vehicle indicator optical projection device wherein instrumentation information is reflected off of a reflecting screen on the inboard surface of the vehicle windshield. The reflecting surface has a satin finish and can be metal, glass, or plastic.

U.S. Pat. No. 2,750,833 to Gross teaches an optical display system for eliminating double images which occur in reflector type sights such as are used in gun sighting insulations in aircraft, by polarization of the collimated light beam and separation of the two-way branches by means of rotation of the plane of polarization and extinction of one of the branches.

U.S. Pat. No. 3,276,813 to Shaw, Jr. teaches a motor vehicle display system which utilizes a highly reflective coating on the inboard surface of the vehicle windshield to reflect instrumentation information to the vehicle operator.

U.S. Pat. No. 3,446,916 to Abel teaches an image combiner utilizing a portion of the aircraft window, the inner surface of the portion being coated with a partially reflecting film and being paraboloidal in shape.

U.S. Pat. No. 3,899,241 to Malobicky, Jr. et al. teaches a windshield adapted for use in aircraft and includes a transparent reflective coating on the inboard surface in the center portion of the forward vision area to form a vision image receiving area. Vehicle information is reflected off the reflective coating to the vehicle operator.

U.S. Pat. Nos. 3,940,204 Withrington and 4,218,111 to Withrington et al. teach an optical display system utilizing holographic lenses.

U.S. Pat. No. 4,261,635 to Freeman teaches a heads-up display system including a holographic combiner positioned inboard of the vehicle windshield. The hologram is disposed substantially orthogonal to and midway along an axis between the observer eye position and the projection opticals so as to deviate light from an image produced by the projection opticals to the observer eye with minimal field aperation.

U.S. Pat. No. 4,398,799 to Swiff teaches a heads-up display system wherein the pilots view is recorded on a head mounted camera to which light from the outside scene and superimposed display is reflected off a head mounted mirror.

U.S. Pat. No. 4,613,200 to Hartman teaches a head-up display system using two parallel holographic optical elements to reflect instrumentation information to the vehicle operator. One of the elements is made part of or attached to the vehicle windshield.

U.S. Pat. No. 4,711,544 to Iino et al. teaches a display system for vehicle wherein instrumentation information is reflected off of the front glass of the vehicle so that the image display can be formed in a desired position aligned with the line of sight of the driver without obstructing the front sight of the driver.

These patents teach various display systems. However, they do not teach a holographic windshield using solely a holographic film positioned within the windshield as the display reflecting surface, i.e., collimator, for the display system.

SUMMARY OF THE INVENTION

The present invention teaches a windshield for a head-up display system wherein a hologram is positioned within the windshield. In a typical trilayer windshield assembly i.e., a windshield having two complimenting curved glass plies laminated together with a plastic interlayer sheet therebetween, the hologram is either embedded within the plastic interlayer or secured to one of the glass plies at the interface between the glass and interlayer. In a bilayer windshield configuration i.e., a windshield having a single glass ply secured to a plastic interlayer, the hologram is secured either to the exposed surface of the interlayer, embedded within the interlayer, or secured to the glass at the interface between the glass and the interlayer.

In one particular embodiment of the present invention, the hologram is initially developed on a flexible carrier substrate. This allows easy positioning of the hologram at the desired spot within the windshield. In assembling the windshield, the hologram and carrier are secured to either the interlayer material or glass surface of one of the glass plies during a preliminary assembly operation. The carrier substrate is then removed from the hologram, for example by peeling, so that only the hologram is left as the reflective element of the windshield. Depending on the sensitivity of the hologram to temperature and pressure variables, the laminating technique used to assemble the windshields is modified so as to maintain the integrity of the hologram throughout the assembly operation.

DETAILED DESCRIPTION OF THE INVENTION

The present invention teaches a laminated windshield assembly with a combiner for a heads up display system laminated between the glass plies of the windshield, but it is understood that the invention may be used in any type of vehicle or structure where a thin undistorted combiner is to be used in conjunction with the transparency. For the purposes of clarity, as used herein, the term "hologram" means a holographic recording media or film, such as dichromated gelatin, the term "holographic element" means the hologram supported on a carrier film or substrate, the term "combiner" means either a hologram or a holographic element positioned relative to the transparency to combine a virtual image of a projected image source with the real world view.

Figure 1:
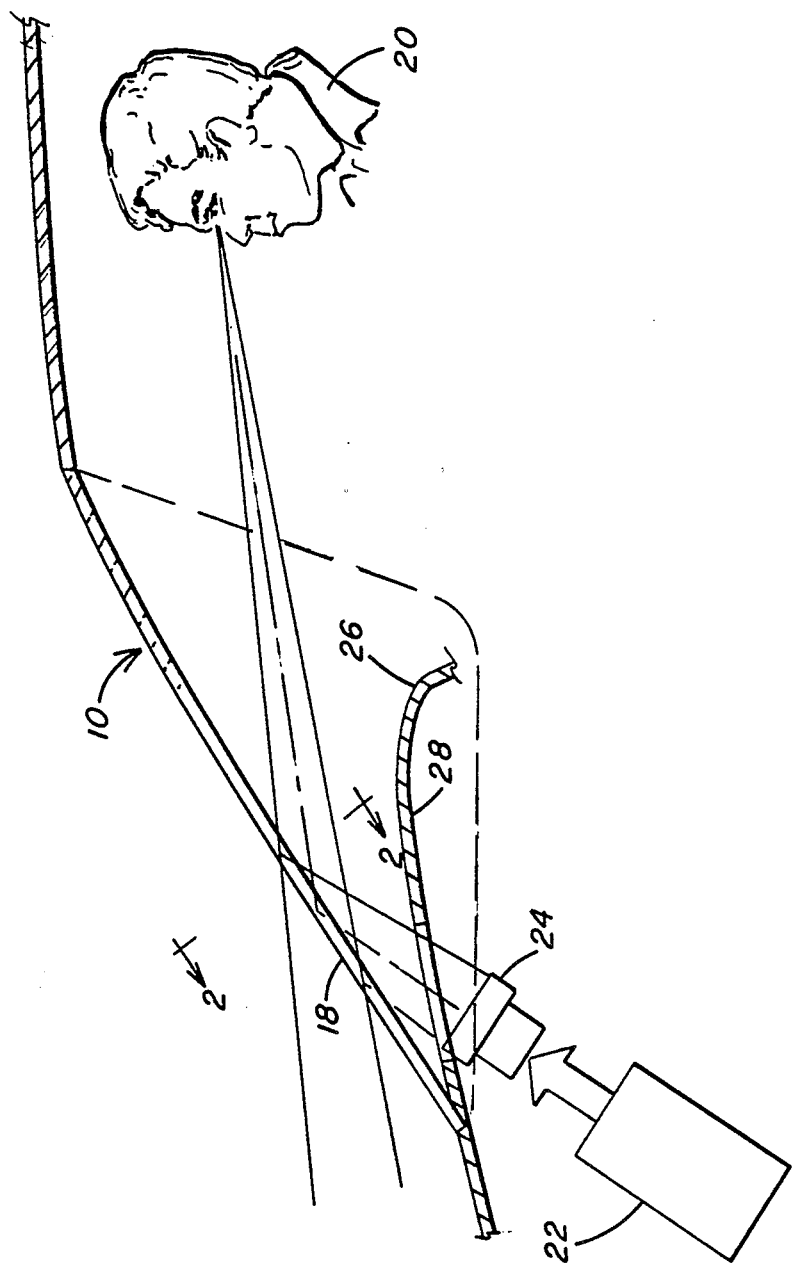
FIG. 1 is a schematic of a heads-up display system incorporating the novel holographic windshield of the present invention.
Figure 2:
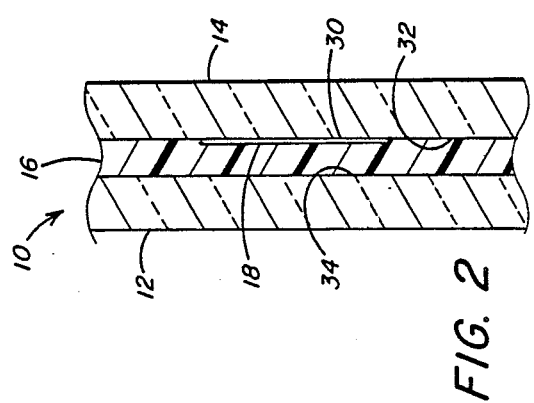
FIG. 2 is an enlarged cross-sectional view taken through lines 2—2 in FIG. 1 showing the hologram within the windshield assembly.

With reference to FIGS. 1 and 2, the transparency of the head up display system of the present invention comprises a motor vehicle windshield 10 including outer glass ply 12, inner glass ply 14, and interlayer sheet 16 and incorporates a combiner 18 for reflecting information carrying light rays into the field of vision of a motorist 20. Although not limiting in the present invention, in the preferred embodiment of the invention, the combiner 18 is laminated within the windshield 10, directly against a major surface of either glass ply 12 or 14, as will be discussed later. Light rays emanate from an image source 22 and are projected onto the combiner 18. The combiner 18 is manufactured to reflect wavelengths of light included within a predetermined narrow bandwidth which corresponds to the wavelength and angle of incidence of the light that is projected onto the combiner 18.

A suitable projection assembly 24 is preferably mounted immediately beneath the upper surface 26 of the vehicle dashboard 28 and is positioned between the image source 22 and the combiner 18 to project the light onto the combiner 18. The light rays projected onto the combiner 18 are collimated so as to create a virtual image anywhere in front of the vehicle and preferably about 10 to 50 feet (3 to 15 m) in front of the windshield 10. In situations where the combiner 18 is not a planar surface, for example, if the combiner 18 is on or within a curved windshield, the optical assembly 24 will also have to compensate for spherical and optical aberrations introduced by the curvature of the windshield.

The image source 22 preferably is a transmissive liquid crystal display (LCD) that is adequately illuminated to project information carrying light rays through the optical assembly 24 to the combiner 18. The displayed image (not shown) may include numerical or graphical symbols representing, for example vehicle speed, fuel level, engine RPM, temperature, and warning messages. Referring to FIG. 2, the combiner 18 is positioned between the glass plies of the windshield 10 as will be described later.

The combiner 18 is located within a particular region relative to the vehicle operator's direct line of sight. The preferred location of the combiner 18 provides an information display region that permits peripheral viewing of the outside real world scene as the operator monitors the display. It is contemplated that alternative locations will also provide an effective head up display for a vehicle windshield.

Referring to FIG. 2, in the windshield 10 of the present invention, the combiner 18 is a hologram laminated between the transparent glass plies of the windshield 10. It has been found that conventionally manufactured holograms may require modified processing to withstand a typical windshield lamination process which normally heats the windshield to about 275° F. (135° C.) at a pressure of about 200 psi (14.1 kg/cm$^2$), and that the hologram is more easily manufactured in planar form and then bent to conform to the final contour of the windshield 10 during lamination.

Attention is now turned to the processing of one particular hologram and holographic element that was incorporated into a laminated windshield assembly for use as a combiner, but it is understood that the present invention is not limited to any particular type of hologram or reflective surface. Additional holographic windshield 10 were fabricated using other holograms supplied by Flight Dynamics, Inc., Portland, Oreg.

A holographic element is formed by depositing a layer of holographic recording medium, between about 10 to 40 microns in thickness, on a substrate. The substrate which may be either transparent or opaque, is secured in a planar orientation by a support mechanism, such as a conventional vacuum holder, as the layer of holographic recording material is deposited onto the substrate. A suitable holographic recording material would be a photosensitive emulsion such as, for example, a VSP grade gelatin available from J. T. Baker Chemical Company. The substrate is flexible and preferably is a polyester or polycarbonate film approximately 0.125 millimeters in thickness. If the selected substrate is hydrophobic, a suitable subbing agent, i.e. primer, is applied to the surface of the substrate upon which the layer of gelatin is deposited. The subbing agent provides the surface with hydrophilic characteristics that provide effective bonding between the gelatin and the substrate.

After it is deposited on the substrate, the gelatin layer is sensitized in a solution of ammonium dichromate as is known in the art. The gelatin is then exposed to light to create the hologram. Preferably the hologram is exposed using the techniques described in U.S. Pat. No. 4,582,389 to Cannata et al., which teachings are herein corporated by reference.

Once exposed, the hologram is processed in a conventional manner as is known in the art. One acceptable processing procedure comprises washing the holographic element for 15 minutes in running water having a temperature of between about 60° F. and 68° F. (16° C. and 20° C.); soaking it in isopropanol for two minutes with continuous agitation; and drying the holographic element in a vacuum oven for two hours at a temperature at least about 212° F. (100° C.).

After the initial processing, secondary processing of the holographic element may be required to ensure that the hologram will withstand the temperatures and pressures of a windshield lamination process. The secondary processes entail an optional step of applying a moisture barrier to the hologram followed by heat stabilizing the hologram and storing it in a relatively low humidity environment.

Although not limiting in the present invention, the holographic element described above is dipped into a solution of a highly volatile solvent and a solute. After the solvent is evaporated, the remaining solute forms an effective moisture barrier covering the exposed surface of the hologram and serves as a humidity stabilizing agent for the hologram during a lamination process. A preferred solution is a two percent by weight solution of fluorocarbon powder based on a polychlorotrifluoroethylene resin such as that manufactured by M. W. Kellogg Company under the Trademark KEL-F, dissolved in liquid freon. After the holographic element is dipped in the solution, the freon is evaporated, leaving the KEL-F moisture barrier coating the hologram surface. Although a two percent solution is preferred, acceptable results can be obtained with a 0.5% to 5% solution. The above described deposition of a moisture barrier would be unnecessary if the interlayer used in the lamination process has sufficiently low moisture content, such as 0.2% or less, so as to not adversely affect the hologram.

After the moisture barrier has been applied, the hologram is heat stabilized by placing the holographic element in a vacuum oven and heating it from room temperature to a peak temperature of between about 220° F. to 285° F. (120° C. and 140° C.), within about 30 to 90 minutes, and then slowly cooled for about 60 to 120 minutes until it reaches room temperature. In the holographic element described above, it is preferably heated to about 275° F. (135° C.) for about 60 minutes and then cooled to room temperature in about 90 minutes.

Finally, the holographic element is stored in an environment having a relative humidity of less than about 30% and a temperature of between about 68° F. and 86° F. (20° C. and 30° C.) until it is laminated into the windshield, as will be discussed later. After this secondary processing, the holographic element is approximately 0.15mm thick.

Referring to FIG. 2, it is noted that the combiner 18 of windshield 10 includes only a hologram 30 and not the substrate on which the hologram 30 is processed as discussed earlier. With continued reference to FIG. 2, the holographic windshield 10 includes inner glass ply 14 laminated to outer glass ply 12 with an interlayer material 16, such as polyvinylbutyral (PVB), positioned therebetween. Glass plies 12 and 14 are bent in any conventional well known shaping technique to provide a pair of complimenting shaped glass plies. In the particular embodiment of the present invention illustrated in FIG. 2, hologram 30 is positioned directly against the outboard surface 32 of inner ply 14.

Figure 6:
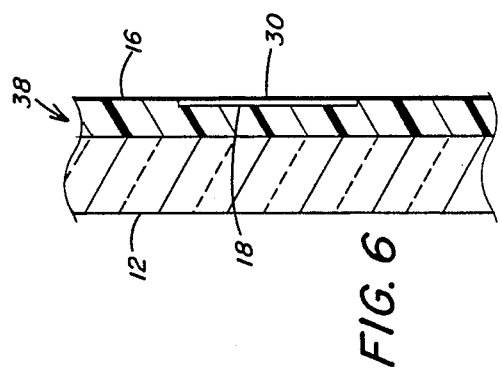

Holograms are sensitive to both heat and pressure. In a windshield laminating operation, for example as taught in U.S. Pat. No. 4,102,722 to Shoop, the windshield assembly is laminated for 30 minutes at a pressure of 200 psi (14 kg/cm) and 275° F. (135° C.). It has been found that the hologram described earlier would be damaged if subjected to these conditions so that it could not be used as a combiner for the purposes of this invention. As a result the fabrication of the windshield 10 was modified to be a multi-step operation that includes two laminating cycles. In the first laminating operation, the holographic element, which includes the hologram 30 on a carrier film, is laminated to a layer of PVB interlayer which in turn is laminated to the outer glass ply 12 to form a bilayer assembly. In one particular embodiment of the invention, the interlayer is first positioned on the inboard surface 34 of the outer glass ply 12. The interlayer sheet 16 is coated with an adhesive, such as but not limited to polyurethane, in the area that will come in contact with the holographic element. The element is then placed over the polyurethane coated area with the hologram 30 of the element in direct contact with the adhesive. The remainder of the bilayer assembly i.e., that portion of the interlayer 16 not covered by the holographic element is covered with a slip sheet having the same thickness as the holographic element. The slip sheet is a material that will not stick to the interlayer 16 during a laminating operation and may be, for example polyethylene or material with a release coating such as silicone based film. The slip sheet includes an opening located and sized to generally correspond to the location and size of the holographic element positioned on the interlayer 16. A press plate which may be the complimenting curved inner glass ply 14, is then positioned over the bilayer assembly and slip sheet and the total assembly is laminated. Although not limiting in the present invention, in the preferred laminating operation, the assembly is placed in a bag and de-aired in a manner well known in the art and as taught in U.S. Pat. No. 3,311,517 to Keslar et al., which is hereby incorporated by reference, and autoclaved at a temperature within the range of approximately 160° F. to 200° F. (71° C. to 93° C.) at 15 psi to 60 psi (1.05 kg/cm$^2$ to 4.22 kg/cm$^2$) for 15 to 45 minutes. With the type of hologram 30 described earlier, the bilayer assembly is preferably laminated at about 175° F. (79° C.) and 25 psi (1.76 kg/cm$^2$) for about 30 minutes. After the first laminating cycle, the bilayer assembly is removed from the bag and the press plate and slip sheet are removed from the interlayer. The carrier substrate is then separated from the hologram by a peeling operation to form a bilayer windshield 38 as shown in FIG. 6 which has only the hologram secured to the interlayer.

After peeling, the trilayer windshield 10 is assembled. The inner glass ply 14 is positioned over the interlayer 16 and the windshield assembly is rebagged, de-aired, and laminated in an autoclave to form the final product. This laminating operation must be controlled so as to not to destroy the hologram due to excessive heat and/or pressure. Using a hologram of the type discussed earlier, the temperatures and pressures are increased in steps. Although not limiting in the present invention in one particular laminating process, the temperature is increased from room temperature to a temperature within the range of approximately 140° F. to 175° F. (60° C. to 79° C.) and held for about 10 to 20 minutes. The temperatures are then increased to within a range of approximately 225° F. to 275° F. (107° C. to 135° C.) and held for approximately 45 to 120 minutes. The temperature is then reduced to room temperature. With respect to the pressure, the autoclave is pressurized to within a range of approximately 25 psi to 100 psi (1.76 kg/cm$^2$ to 7.03 kg/cm$^2$) and held until the temperature within the autoclave reaches the second elevated temperature range. At this time the pressure is increased to within a range of approximately 150 psi to 225 psi (10.5 kg/cm$^2$ to 15.8 kg/cm$^2$) and held until the temperature is reduced back to room temperature. With the type of hologram 30 described earlier the second laminating operation preferably includes heating the assembly to about 150° F. (66° C.) for about 15 minutes and then increasing the temperature to about 240° F. (116° C.) and holding it at temperature for about 90 minutes before cooling it to room temperature. With respect to the pressure, the assembly is subjected to a pressure of about 50 psi (1.05 kg/cm$^2$) until the temperature reaches about 240° F. (116° C.) at which time the pressure is increased to about 200 psi (14.1 kg/cm$^2$) and held until the temperature is reduced back to room temperature.

If required, prior to the final assembly of the windshield, the interlayer 16 may be sprayed with a solution of PVB to provide an embossed surface on the interlayer 16 so as to help de-air the assembly prior to the second laminating operation. In addition, a thin layer of polyurethane or other suitable thermoplastic adhesive may be applied either to the exposed hologram surface, and/or the outboard surface 32 of the inboard glass ply 14 in the area where the hologram will contact the inner glass ply to help wet and bond the hologram's surface.

Although the windshield de-airing is preferably done by a bagging process, it would be obvious to one skilled in the art that other de-airing techniques such as using de-airing channels or prepressing rolls as taught in U.S. Pat. Nos. 3,281,296 to Jameson and 4,696,713 to Okafuji et al., respectively.

The relative adhesion characteristics between the hologram and the interlayer and the hologram and the substrate may affect the peeling operation. If the hologram/interlayer adhesion is greater than the hologram/substrate adhesion, some of the adhesive between the hologram and substrate may remain on the exposed hologram surface after peeling. If the hologram/interlayer adhesion is less than the hologram/substrate adhesion, the hologram may shear, leaving imperfections in the exposed hologram surface. The former condition is preferred.

As an alternative to the previously described fabrication method, the hologram 30 may be secured directly to the outboard surface 32 of the inner glass ply 14 during an initial operation. Although not limiting in the present invention, a vacuum pressing technique may be used to secure the hologram 30. In particular, the hologram 30 and/or the portion of the inner glass ply 14 to be in contact with the hologram 30 is coated with an adhesive, such as polyurethane. The holographic element is then positioned on the inner glass ply 14 with the hologram 30 contacting the surface 32. A conformable pressing member, such as for example, a vacuum blanket, may be positioned over the element to remove air from between the glass 14 and hologram 30 and press the element against the glass ply 14. When a thermoplastic adhesive is used, such as polyurethane, the assembly is heated to the range of 160° F. to 200° F. (71° C. to 93° C.) and preferably to about 175° F. (79° C.) during the de-airing step. After the element is secured, to the glass ply 14 the blanket is removed, the assembly is cooled, and the carrier substrate is peeled off the assembly leaving the glass ply 14 with only the hologram 30. The windshield 10 is then assembled i.e.. the interlayer 16 is placed on the outboard surface of the inner glass ply 14 and the outer glass ply 12 is positioned over the interlayer. The assembled windshield is de-aired and laminated in an autoclave as discussed earlier in the second laminating operation.

An an alternative to removing the carrier substrate by peeling, the substrate may be made of a material that can be dissolved once the hologram is secured to the glass or interlayer ply. Although not limiting in the present invention, the holographic recording medium may be deposited on a substrate of polystryrene. A subbing agent may be applied to obtain suitable adhesion. The hologram is processed and secured to the interlayer or glass surface of the windshield as discussed earlier. The polystryrene carrier substrate is then dissolved using, for example pentane or benzene, leaving the hologram secured in place.

Figure 4:
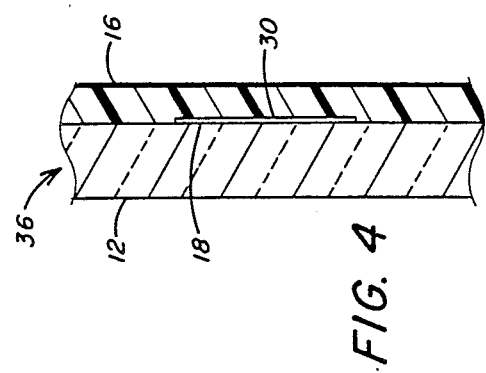

It should be noted that for a curved windshield, when the holographic element is secured either to the interlayer of the bilayer assembly or a glass ply, the element is curved to conform to the windshield curvature during the initial securing operation. It is believed that, as an alternative, the element may be secured to a flat interlayer 16, without a glass ply, by pressing and heating the element and interlayer 16 between slip sheets and flat press plates. After the interlayer 16 is cooled, the carrier substrate can be peeled from the interlayer 16, leaving the hologram 30. The windshield 10 may then be assembled and laminated, using the interlayer 16, as discussed earlier, to form the trilayer windshield configuration 10 illustrated in FIG. 2 or the bilayer windshield configuration 36 and 38 illustrated in FIGS. 4 and 6, respectively.

It should be appreciated that the temperatures and pressures used during the glass windshield laminating steps are dictated by the sensitively of the hologram to these variables. The less sensitive the hologram is to these variables, the closer the temperatures and pressures can be to conventional windshield laminating parameters. If the hologram 30 could survive exposure to the combined temperature and pressure of a conventional windshield laminating operation, it is believed that the multi-step operation as described above would not be necessary.

It should be further appreciated that the laminating cycle described is for a glass windshield. Rather than modifying the hologram, if the laminating cycle of the assembly were different, for example if different transparent plies were used that require lower elevated temperatures and/or pressures, a one step laminating cycle could be used.

As a further improvement to the process, if the hologram 30 could survive the bending temperature of the ply, e.g., about 1200° F. (648° C.) for glass, it can be appreciated that the hologram 30 may be adhered to the glass before a bending and shaping operation.

There are several advantages resulting from positioning the combiner 18 against a glass ply and eliminating the carrier substrate. First, the glass ply provides a rigid, optically acceptable surface that will not warp, flow or deform during the laminating operation so that the hologram does not deform during lamination and remains parallel to the glass surface. In addition by eliminating the carrier, an additional element is removed from the windshield that may cause optical defects in the windshield as well as additional reflective surfaces within the windshield. Furthermore, it is believed that the incorporation of the entire holographic element as the combiner into the windshield would require multiple interlayer plies of various thicknesses to offset the thickness of the holographic element. Another advantage is that the glass provides a superior moisture barrier along the contacted major surface of the hologram.

Figure 3:
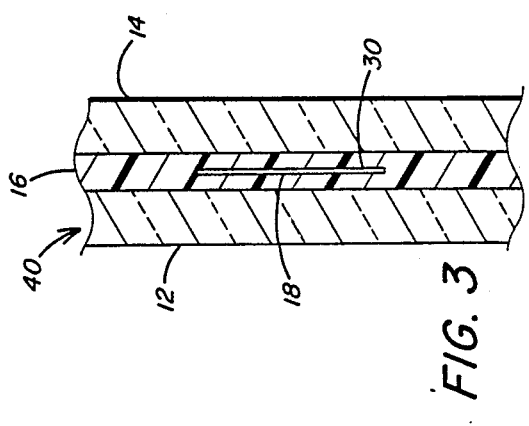
FIGS. 3 through 6 are enlarged cross-sectional views similar to that shown in FIG. 2 of alternative embodiments of a windshield incorporating the novel features of the present invention.
Figure 5:
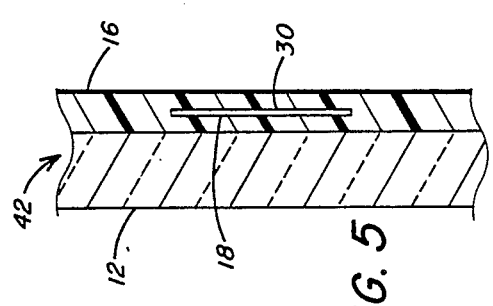

It should be obvious to one skilled in the art that the hologram may be embedded within the interlayer of the windshield rather than secured to the glass ply simply by positioning a second interlayer sheet between the bilayer assembly with the hologram and the inner glass ply and laminating the assembly as discussed earlier as shown in trilayer windshield configuration 40 in FIG. 3 is bilayer configuration 42 in FIG. 5.

Although the previous discussion has been directed towards a combiner in the form of a hologram within the windshield, the head up display windshield may alternatively use a wavelength selective coating on the outboard surface of the inner glass ply. By positioning the reflective coating within the windshield, it is protected against abuse such as rubbing, smoke, scratching, and solvents and is sealed from moisture. Although not limited in the present invention, the reflective coating may be a tin oxide coating as taught in U.S. Pat. No. 3,477,936 to Gillery et al., be to applied by any convenient method, such as vacuum deposition before or after the glass plies 12 and 14 are bent to shape.

The form of this invention shown and described in this disclosure represents an illustrative preferred embodiment and various modifications thereof. It is understood that various changes may be made without departing from the spirit of the invention as defined by the claimed subject matter which follows.

We claim:

1. A method of assembling a laminated holographic transparency comprising:
   positioning an interlayer sheet on a surface of a rigid ply;
   positioning a hologram supported on a carrier on a major surface of said sheet;
   laminating said ply, sheet, hologram and carrier together to form a unitary structure;
   removing said carrier said structure such that said hologram remains laminated to said structure;
   laminating at least one additional rigid ply to said interlayer sheet, wherein said interlayer and said hologram are positioned between said plies.

2. The method as in claim 1 wherein said removing step includes peeling said carrier from said adhered hologram.

3. The method as in claim 1 wherein said removing step includes dissolving said carrier from said adhered hologram.

4. The method as in claim 1 further including the step of securing additional plies to said transparency.

5. The method as in claim 1 wherein said first laminating step includes the steps of heating said transparence to a temperature in the range of about 160° F. to 200° F. while applying a pressure in the range of about 15 to 60 psi for approximately 15 to 45 minutes.

6. The method as in claim 5 wherein said laminating step includes heating to approximately 175° F. at a pressure of approximately 25 psi for approximately 30 minutes.

7. The method as in claim 1 wherein said second laminating step includes the steps of heating said transparency to a temperature range of approximately 140° F. to 175° F. for about 10 to 20 minutes, increasing said temperature to approximately in the range of 225° F. to 275° F., maintaining said temperature for approximately 45 to 120 minutes, and reducing said temperature to approximately room temperature.

8. The method as in claim 7 wherein said second laminating step further includes the step of applying a pressure to said transparency in the range of approximately 25 to 100 psi, maintaining said pressure until said temperature is elevated to the range between 225° F. to 275° F., increasing said pressure to approximately 150 to 225 psi, and maintaining said pressure until the temperature of said assembly is reduced approximately to room temperature.

9. The method as in claim 8 wherein said second laminating step includes the steps of heating to about 150° F. for approximately 15 minutes, increasing said temperature to about 240° F., maintaining said temperature for approximately 90 minutes and reducing said temperature to room temperature and further includes the steps of applying a pressure of about 50 psi while said transparency is initially heated, maintaining said pressure until said temperature is elevated to about 240° F., increasing said pressure to about 200 psi, and maintaining said pressure until said temperature is reduced to room temperature.

10. The method as in claim 9 wherein said addition plies include a second interlayer sheet and an addition rigid ply and further including the step of positioning said second interlayer between said first interlayer and said second rigid ply prior to said second laminating step such that said unsupported hologram is positioned between said plastic interlayers of said windshield.

11. A holographic transparency made according to claim 1.

12. A method of fabricating a transparency comprising:
   adhering a hologram supported on a carrier to a major surface of a rigid ply or flexible ply wherein said hologram is positioned between said carrier and said ply;
   removing said carrier such that said hologram remains adhered to said ply;
   securing said rigid ply to said flexible ply; and
   securing an additional rigid ply to said flexible ply such that said flexible ply is positioned between said rigid plies.

13. The method as in claim 12 wherein said adhering step includes applying adhesive between said hologram and ply, positioning a pressing member in overlaying relation over said carrier, and removing air from between said ply and said hologram.

14. The method as in claim 13 wherein said adhering step includes the step of heating the portion of said ply in contact with said hologram.

15. The method as in claim 12 wherein said first securing step includes positioning said hologram between said rigid and flexible plies.

16. A holographic transparency made according to claim 15.

17. A holographic transparency made according to claim 12.

18. A laminated vehicle windshield comprising:
first and second glass plies;
a polyvinylbutyral interlayer secured between said first and second plies; and
a hologram unsupported by a carrier secured to a major surface of one of said glass plies and positioned within said transparency.

19. The transparency as in claim 18 further including additional transparent plies secured to at least one of said glass plies.

20. The windshield as in claim 18 wherein any optical distortion of an image viewed through said windshield resulting from additional elements within said windshield is due solely to said hologram.

21. A method of assembling a holographic transparency comprising:
positioning an interlayer sheet on a surface of a rigid ply;
positioning a hologram supported on a carrier on a major surface of said sheet;
heating said ply, sheet, hologram and carrier to a temperature in the range of about 160° F. to 200° F. while applying a pressure in the range of about 15 to 60 PSI for approximately 15 to 45 minutes to adhere said ply, sheet, hologram, and carrier together and form a unitary structure; and
removing said carrier from said hologram such that said hologram remains adhered to said sheet.

22. A holographic transparency made according to claim 21.

23. A method of fabricating a transparency comprising:
adhering a hologram supported on a carrier to a major surface of a glass ply or plastic interlayer sheet wherein said hologram is positioned between said carrier and said ply or sheet;
removing said carrier such that said hologram remains adhered to said ply or sheet;
securing said sheet to said ply wherein said hologram is positioned between said ply and sheet; and
securing an additional glass ply to said interlayer sheet such that interlayer sheet is positioned between said glass plies.

24. A laminated vehicle windshield comprising:
first and second glass plies;
a polyvinylbutyral interlayer secured between said first and second plies; and
a hologram unsupported by a carrier and imbedded within said interlayer of said windshield.

25. The windshield as in claim 24 wherein any optical distortion of an image viewed through said windshield resulting from additional elements within said windshield is due solely to said hologram.

* * * * *

UNITED STATES PATENT AND TRADEMARK OFFICE
CERTIFICATE OF CORRECTION

PATENT NO. : 4,998,784
DATED : March 12, 1991
INVENTOR(S) : Glenn E. Freeman et al.

It is certified that error appears in the above-identified patent and that said Letters Patent is hereby corrected as shown below:

Column 10, line 10, "transparence" should be --transparency--.

Signed and Sealed this

Twenty-seventh Day of September, 1994

Attest:

BRUCE LEHMAN

Attesting Officer    Commissioner of Patents and Trademarks